PHASE SENSITIVE STRAIN GAGE AMPLIFIER RECTIFIER CIRCUIT
Filed Oct. 23, 1952
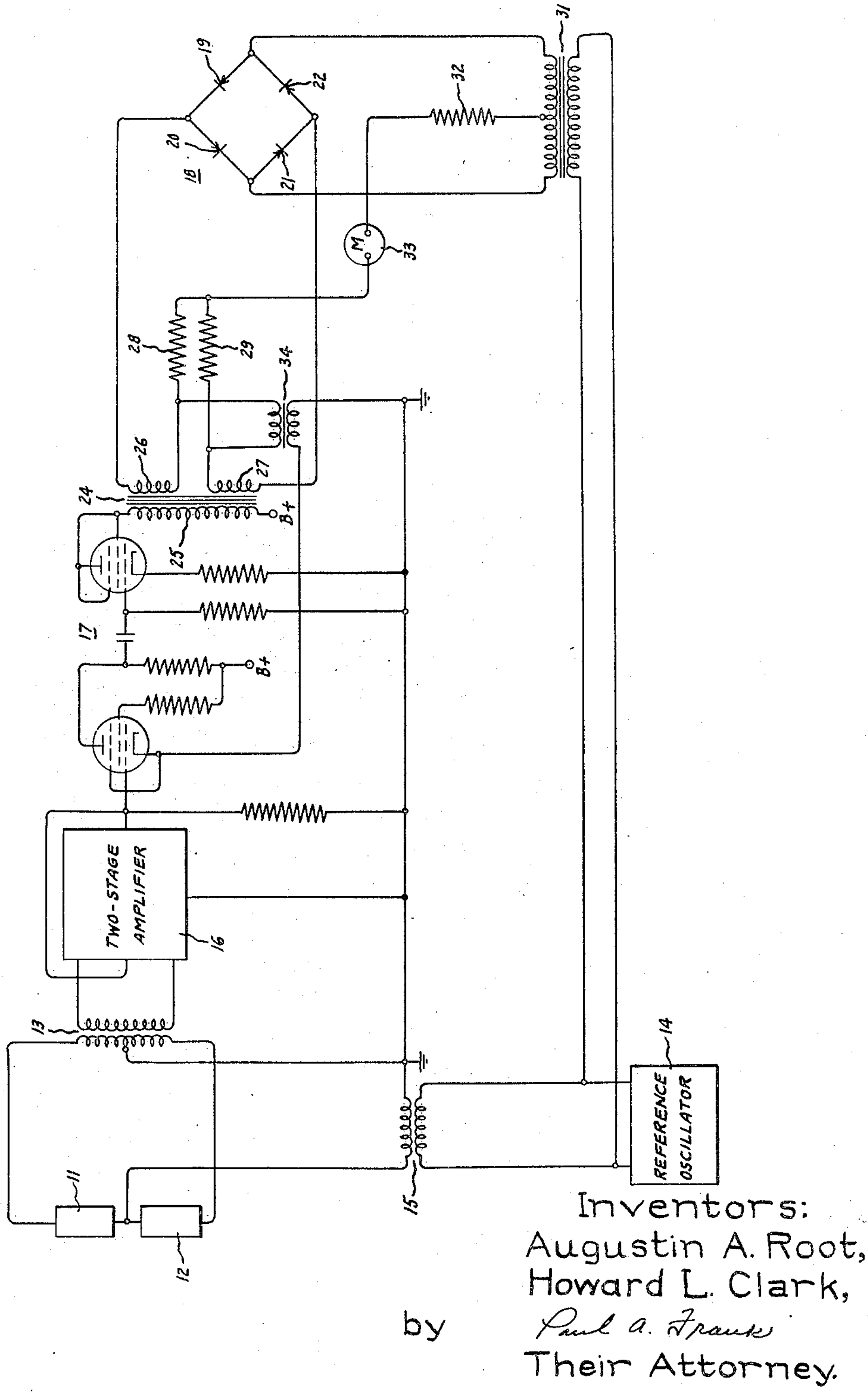
Inventors:
Augustin A. Root,
Howard L. Clark,
by Paul A. Frank
Their Attorney.

United States Patent Office 2,780,778

Patented Feb. 5, 1957

2,780,778

PHASE SENSITIVE STRAIN GAGE AMPLIFIER RECTIFIER CIRCUIT

Augustin A. Root, Schenectady, and Howard L. Clark, Ballston Lake, N. Y., assignors to General Electric Company, a corporation of New York Application October 23, 1952, Serial No. 316,462

8 Claims. (Cl. 324—87)

The present invention relates to a new and improved rectifier circuit.

More specifically, the invention relates to a rectifier circuit capable of deriving a variable amplitude, reversible polarity feedback electric signal, and to a feedback stabilized amplifying and rectifying system incorporating such a rectifier as a part thereof.

In strain gage measuring apparatus, and other similar types of equipment, it is quite frequently desirable to obtain maximum sensitivity with an absolute minimum number of components. In particular, it is desirable to reduce the number of amplification stages included in the equipment to as few as possible, and yet at the same time allow no corresponding sacrifice in the operation of the equipment. In order to accomplish this latter objective, a feedback stabilized amplifier must be used in conjunction with a rectifier stage so that it is necessary to derive a feedback signal from the rectifying stage for application to the amplification stage in degenerative or regenerative feedback relation. While there are a number of presently known rectifying circuits suitable for use in this manner, they are not entirely satisfactory due to the fact that such known rectifying circuits are not capable of deriving a suitable, alternating voltage feedback signal which reverses in polarity when the input signal to the rectifying circuit reverses in phase.

It is, therefore, one object of the present invention to provide a new and improved rectifier circuit that is capable of deriving a variable amplitude, reversible polarity alternating electric signal for feedback purposes.

Another object of the invention is to provide a new and improved feedback stabilized amplifying and rectifying system which includes a rectifier circuit of the above-mentioned type as a part thereof.

In carrying out the above objectives, the invention provides a rectifying circuit comprising phase-sensitive rectifying means, and a first input circuit means coupled across the input terminals of the phase-sensitive rectifying means for applying input signals thereto. The first input circuit means includes an additional impedance for deriving feedback electric signals indicative of the phase and amplitude of the input signal applied to the first input circuit means. A second input circuit means is coupled across the output terminals of the rectifying means for applying a reference signal thereto, and conductive means interconnect the second input circuit means with the additional impedances in the first input circuit means. An output signal developing circuit is then coupled across the additional impedances for deriving the desired feedback electric signal for application to the input of an amplifying system or the like.

Other objects, features, and many of the attendant advantages of this invention will be appreciated more readily as the same becomes better understood by reference to the following detailed description when considered in connection with the accompanying drawing which is a schematic circuit diagram of a strain gage amplifying system utilizing the new and improved rectifier circuit.

The apparatus illustrated in the figure of the drawings constitutes a strain gage measuring system for measuring the stress occurring in a particular body, temperature, or some other physical phenomena. The system includes a pair of strain gages 11 and 12 of the variable inductance or resistance type connected in a balanced bridge circuit relationship with the primary winding of a transformer 13. The balanced bridge thus comprised is excited from a source of reference oscillations 14 coupled across the primary winding of a transformer 15 having the secondary winding thereof connected across the diagonally opposite terminals of balanced bridge 11—13 formed by the interconnection between the strain gages 11, 12, and approximately the mid tap point of the primary winding of transformer 13. Transformer 13 has the secondary winding thereof connected across the input terminals of a two-stage, degenerative feedback stabilized amplifier 16 of standard construction, and amplifier 16 has its output connected to the input of a second two-stage degenerative feedback stabilized amplifier 17. Amplifier 17 comprises a part of a new and improved amplifying and rectifying system which includes a novel rectifying circuit 18 from which a feedback signal is derived for application to the input of amplifier 17 in degenerative feedback relation.

The novel rectifying circuit 18 comprises a phase-sensitive rectifying means including a rectifier bridge formed by four uniconducting devices 19, 20, 21, and 22 connected in a closed series electrical loop. The uniconducting devices 19—22 may be copper oxide or selenium rectifiers, diode-type electronic tubes or the transistor equivalent of a diode for conducting electrical current in only one direction. Connected across a pair of diagonally opposite input terminals of the rectifier bridge thus comprised, is a first push-pull input circuit means which includes a transformer 24. Transformer 24 has a primary winding 25 connected to the output of two-stage amplifier 17, and has a split secondary winding which forms two half windings 26 and 27. An impedance comprising a resistor 28 and a resistor 29 serve to interconnect the inner adjacent ends of the split secondary half windings 26 and 27, and the outer ends of each of the half windings are connected across diagonally opposite input terminals of the rectifier bridge. A second input circuit means is also connected to the rectifier bridge, and comprises a transformer 31 having the primary winding thereof connected to the source of reference oscillations 14, and the secondary winding thereof connected to the remaining diagonally opposite terminals of the rectifier bridge. The center tap point of the secondary winding of transformer 31 is connected through a suitable smoothing circuit such as an impedance 32, or, if desired, through a filter (not shown), and through an indicator device 33 preferably of the moving coil galvanometer type, to a point on the impedance comprised by resistors 28 and 29. The connection is made to a point intermediate resistors 28 and 29 in a manner such that electric current flowing through the branch of the rectifying circuit including half winding 26, must flow through the resistor 28, and current flowing through the branch of the rectifying circuit including half winding 27, must flow through resistor 29. Upon the occurrence of current flow through the system then, a voltage is produced across either of the resistors 28 or 29. For the purpose of utilizing this voltage, an output circuit means is provided which comprises a transformer 34 having the primary winding thereof connected across resistors 28 and 29, and having the secondary winding thereof connected in the cathode circuit of the second two-stage amplifier 17. By this construction a feedback signal is developed across the secondary winding of transformer 34 which is substantially an exact reproduction of the input signal, and which is applied to the cathode circuit of amplifier 17 in degenerative feedback relationship.

In operation (assuming there is no output signal applied across the primary winding of transformer 24) current from the reference transformer 31 flows through the rectifiers 21 and 22 during one-half cycle of the reference, alternating voltage applied from source 14, and through the rectifiers 19 and 20 during the remaining half cycle of alternating voltage. Each of the rectifiers 19—22 are chosen to have equal resistance with equal currents flowing therethrough, hence, the voltage at the junction of the rectifiers 21 and 22 will be equal to the mid tap point voltage of the secondary winding of transformer 31. Therefore, the juncture of the rectifiers will be at the same potential as the mid tap point of the secondary winding of transformer 31, and no current will flow through the indicating instrument 33. A similar situation occurs with regard to the voltage of the junction of the rectifiers 19 and 20 during the half cycle that current is being conducted through these devices. Assuming next that a voltage exists across the secondary winding of the transformer 24 and that no voltage is applied across the reference transformer, a current will flow through the rectifiers 20 and 21, or 19 and 22 during alternate half cycles of the input signal, and like conditions will exist with reference to the lack of current flow through instrument 33.

If now a reference transformer voltage is applied across transformer 31 which is more than twice the value of the maximum amplitude signal applied across transformer 24, the junction of the rectifiers 20 and 21 will be more negative than the junction of the rectifiers 21 and 22, and hence, no current will flow through rectifier 21 but will flow only through rectifier 20, half winding 26, resistor 28, meter 33, and one half of the secondary winding of transformer 31. During the remaining half cycle, current will pass through meter 33 in the same direction, but will flow through half winding 27 and resistor 29. Should the polarity of the input signal applied across transformer 24 change with respect to the polarity of the reference signal applied across transformer 31, the direction of current flow through meter 33 will likewise change, and hence, so also will the direction of current flow across the resistors 28 and 29. For this reason, the voltage occurring across resistors 28 and 29 reverses in polarity with changes in phase of the input signal applied across transformer 24 from some predetermined standard. Upon reversal of the current flowing through meter 33, the polarity of the voltage applied across transformer 34 will likewise change or reverse itself from the order given. Hence, it can be appreciated that the novel rectifying circuit is capable of attaining a variable amplitude, reversible polarity a. c. feedback signal which follows substantially the input signal, and hence may be applied to the input stages of the amplifying circuit 17 for stabilization purposes. When the novel rectifying circuit 18 is included in an amplifying system such as that illustrated in Fig. 1 of the drawings, the feedback signal may be applied to the cathode circuit of the first amplification stage of the two-stage amplifier 17 in degenerative feedback relation. The degenerative feedback signal thus developed and applied to the amplification stage 17 results in improving the overall stability and operation of the amplifying and rectifying system by reducing the effects of noise, frequency distortion, and otherwise provides all of the advantages obtained with inverse feedback operation to thereby provide a greatly improved signal at the output of the rectifier portion of the system.

In the light of the foregoing description, other modifications and variations of the invention will suggest themselves to those skilled in the art. It is, therefore, to be understood that changes may be made herein which are within the full intended scope of the present invention as defined by the appended claims.

What we claim as new and desire to secure by Letters Patent of the United States is:

1. A rectifying circuit including in combination rectifying means, push-pull input circuit means coupled across the input terminals of said rectifying means for applying input signals thereto and including additional load resistors interconnecting the respective push-pull paths of said push-pull circuit means for deriving electric signals indicative of the phase and amplitude of the input signal applied to said push-pull input circuit means, second input circuit means coupled across the output terminals of said rectifying means for applying a reference signal thereto, conductor means interconnecting said second input circuit means with the additional load resistors in said push-pull input circuit means, and an output signal developing circuit coupled across said additional load resistors.

2. A feedback stabilized amplifying and rectifying circuit including in combination an amplifier having input and output terminals, a rectifying circuit coupled to the output terminals of said amplifier and comprising rectifying means having input and output terminals, push-pull input circuit means coupled across the input terminals of said rectifying means and including additional load resistors interconnecting the respective push-pull paths of said push-pull circuit means for deriving feedback electric signals indicative of the phase and amplitude of the input signal applied to said push-pull input circuit means, second input circuit means coupled across the output terminals of said rectifying means for applying a reference signal thereto, conductor means interconnecting said second input circuit means with the additional load resistors in said push-pull input circuit means, and an output circuit coupled across said additional load resistors, said output circuit being connected across the input terminals of said amplifier for applying the feedback electric signals thereto in degenerative feedback relation.

3. A rectifying circuit including in combination rectifying means, a signal input transformer having a split secondary winding, an additional load impedance interconnecting the respective inner adjacent ends of the split secondary winding of said transformer, the remaining ends of the secondary windings being connected across the input terminals of said rectifying means for applying input signals thereto, second input circuit means connected across the output terminals of said rectifying means for applying a reference signal thereto, conductor means including an indicator interconnecting said second input circuit means and a point on said additional impedance, and output circuit means connected across said additional impedance.

4. A rectifying circuit including in combination rectifying means, an input transformer having a split secondary winding, a resistor interconnecting the respective inner adjacent ends of the split secondary winding of said transformer, the remaining ends of the secondary windings being connected across the input terminals of said rectifying means for applying input signals thereto, a second input transformer having a center tapped secondary winding, the center tapped secondary winding being connected across the output terminals of said rectifying means for applying a reference signal thereto, conductor means including an indicator interconnecting the center tap on said last-mentioned secondary winding and a point on said resistor, and an output transformer having the primary winding thereof connected across said resistor.

5. A feedback stabilized amplifying and rectifying circuit including in combination an amplifier having input and output terminals, a rectifying circuit coupled to the output terminals of said amplifier and comprising rectifying means having input and output terminals, a signal input transformer having a primary winding connected to said amplifier output terminals and having a split secondary winding, a resistor interconnecting the respective inner adjacent ends of the split secondary winding of said transformer, the remaining ends of the secondary windings being connected across the input terminals of said rectifying means for applying input signals thereto, second input circuit means connected across the output terminals of said rectifying means for applying reference signals thereto, conductor means including an indicator interconnecting said second input circuit means and a point on said resistor, and output circuit means connected across said resistor for deriving a feedback electric signal, said output circuit means being connected to the input terminals of said amplifier for applying the feedback electric signal thereto in degenerative feedback relation.

6. A rectifying circuit including in combination a rectifier bridge, an input transformer having a split secondary winding, an additional impedance interconnecting the respective inner adjacent ends of the split secondary winding of said transformer for deriving electric signals indicative of the phase and amplitude of the input signal applied to said transformer, the remaining ends of the split secondary winding being connected across diagonally opposite terminals of said rectifier bridge for applying input signals thereto, a second input circuit means connected across the remaining diagonally opposite terminals of said rectifier bridge for applying a reference signal thereto, conductor means interconnecting said second input circuit means and a point on said additional impedance, and output circuit means connected across said additional impedance.

7. A rectifying circuit including in combination a rectifier bridge, an input transformer having a split secondary winding, a resistor interconnecting the respective inner adjacent ends of the split secondary winding of said transformer for deriving electric signals indicative of the phase and amplitude of the imput signal applied to said transformer, the remaining ends of the split secondary winding being connected across diagonally opposite terminals of said rectifier bridge, a second input transformer having a center tapped secondary winding, the center tapped secondary winding being connected across the remaining diagonally opposite terminals of said rectifier bridge, conductive means including an indicator interconnecting the center tap on said last-mentioned secondary winding and a point on said resistor, and output circuit means connected across said resistor.

8. A feedback stabilized amplifying and rectifying circuit including in combination an amplifier having input and output terminals, a rectifying circuit coupled to the output terminals of said amplifier and comprising a rectifier bridge, an input transformer having the primary winding thereof coupled to the output terminals of said amplifier and having a split secondary winding, a resistor interconnecting the respective inner adjacent ends of the split secondary winding of said transformer, the remaining ends of the split secondary winding being connected across diagonally opposite terminals of said rectifier bridge, a second input transformer having a center tapped secondary winding, the center tapped secondary winding being connected across the remaining diagonally opposite terminals of said rectifier bridge, conductive means including an indicator interconnecting the center tap on said last-mentioned secondary winding and a point on said resistor, and output circuit means thereof connected across said resistor for deriving a feedback electric signal, said output circuit means being connected to the input terminals of said amplifier for applying the feedback electric signal thereto in degenerative feedback relation.

References Cited in the file of this patent

UNITED STATES PATENTS

| | | |
|---|---|---|
| 2,414,317 | Middel | Jan. 14, 1947 |
| 2,414,318 | Middel | Jan. 14, 1947 |